US010377981B2

(12) United States Patent
Mitchell

(10) Patent No.: US 10,377,981 B2
(45) Date of Patent: Aug. 13, 2019

(54) SOFTWARE TUNING OF RECIPES FOR BEER BREWING SYSTEM

(71) Applicant: PicoBrew, LLC, Seattle, WA (US)

(72) Inventor: William H. Mitchell, Medina, WA (US)

(73) Assignee: PicoBrew, Inc., Seattle, WA (US)

(*) Notice: Subject to any disclaimer, the term of this patent is extended or adjusted under 35 U.S.C. 154(b) by 12 days.

(21) Appl. No.: 14/660,698

(22) Filed: Mar. 17, 2015

(65) Prior Publication Data
US 2016/0272928 A1 Sep. 22, 2016

(51) Int. Cl.
C12C 11/00 (2006.01)
C12C 13/10 (2006.01)
C12C 13/00 (2006.01)
C12C 7/06 (2006.01)
G05B 13/04 (2006.01)
C12C 7/20 (2006.01)
G05B 15/02 (2006.01)

(52) U.S. Cl.
CPC ............ C12C 13/00 (2013.01); C12C 7/06 (2013.01); C12C 7/205 (2013.01); C12C 11/003 (2013.01); G05B 13/041 (2013.01); G05B 15/02 (2013.01)

(58) Field of Classification Search
CPC .................. C12C 7/06; C12C 7/205
IPC ............................... C12C 7/06,7/205
See application file for complete search history.

(56) References Cited

U.S. PATENT DOCUMENTS 941,009 A 11/1909 Cauchois
2,547,481 A 4/1951 McDonald
2,761,200 A 9/1956 Arnett
2,830,528 A 4/1958 Arnett
3,057,726 A 10/1962 Teignmouth
3,102,813 A 9/1963 Teignmouth et al.
(Continued)

FOREIGN PATENT DOCUMENTS

DE 202012103852 U1 11/2012
GB 1444344 A 7/1976
(Continued)

OTHER PUBLICATIONS

Vinepair, Tasting Beer—The Role of Alcohol by Volume (ABV),https:// vinepair.com/beer-101/tasting-beer-the-role-of-alcohol-by-volume-abv/ (accessed Mar. 1, 2018), pp. 1-5.*
(Continued)

Primary Examiner — Kathryn Wright
(74) Attorney, Agent, or Firm — Russell S. Krajec; Krajec Patent Offices, LLC

(57) ABSTRACT

A beer making system may modify a beer ingredient/process recipe to adjust sensory characteristics of a desired beer. With a given ingredient list and starting recipe, a performance model of a brewing system may be used to generate an updated recipe when given a set of desired sensory characteristics of a desired beer. A user interface may permit a user to adjust characteristics such as thin/thick mouthfeel, dryness/maltiness, hops bitterness, hops flavor, hops aroma, and other characteristics. An updated recipe may change mashing schedules, boiling schedules, or other programmatically controlled aspects of a brewing system. The performance model may include heuristics as well as performance metrics derived from observing previous brewing sessions on one or multiple devices.

6 Claims, 9 Drawing Sheets

(56) References Cited

U.S. PATENT DOCUMENTS

| | | |
|---|---|---|
| 3,232,211 A | 2/1966 | O'malley |
| 3,563,157 A | 2/1971 | Lenz |
| 3,683,790 A | 8/1972 | Jr et al. |
| 3,759,483 A | 9/1973 | Baxter |
| 3,984,326 A | 10/1976 | Bendel |
| 4,054,523 A | 10/1977 | Ingenito et al. |
| 4,373,024 A | 2/1983 | Hunt |
| 4,441,406 A | 4/1984 | Becker et al. |
| 4,503,502 A | 3/1985 | Chapin |
| 4,552,060 A | 11/1985 | Redl et al. |
| 4,557,186 A | 12/1985 | Brown |
| 4,751,875 A | 6/1988 | Wooten |
| 4,754,696 A | 7/1988 | Sarazen et al. |
| 4,754,698 A | 7/1988 | Naish |
| 4,790,239 A | 12/1988 | Hewitt |
| 4,846,969 A | 7/1989 | Ordelheide et al. |
| 5,158,793 A | 10/1992 | Helbling |
| 5,265,518 A | 11/1993 | Reese et al. |
| 5,311,811 A | 5/1994 | Kuzyk |
| 5,413,566 A | 5/1995 | Sevrain et al. |
| 5,865,093 A | 2/1999 | Wasmuht et al. |
| 5,868,062 A | 2/1999 | Enomoto |
| 5,906,151 A | 5/1999 | Firestone et al. |
| 5,922,191 A | 7/1999 | Mata et al. |
| 5,970,846 A | 10/1999 | Roehr |
| 6,032,571 A | 3/2000 | Brous et al. |
| 6,276,264 B1 | 8/2001 | Dumm |
| 6,475,537 B1 | 11/2002 | King et al. |
| 6,629,490 B1 | 10/2003 | Lu et al. |
| 6,666,967 B1 | 12/2003 | Oyabu |
| 7,963,213 B1 | 6/2011 | Murdock |
| 8,141,477 B2 | 3/2012 | Broderick |
| 8,993,273 B1 | 3/2015 | Blichmann |
| 9,102,908 B1 | 8/2015 | Mitchell et al. |
| 9,109,192 B1 | 8/2015 | Mitchell et al. |
| 9,228,163 B1 | 1/2016 | Mitchell et al. |
| 9,376,653 B1 | 6/2016 | Mitchell et al. |
| 9,688,949 B2 | 6/2017 | Mitchell et al. |
| 9,932,547 B2 | 4/2018 | Mitchell et al. |
| 2001/0035097 A1 | 11/2001 | Shaanan et al. |
| 2002/0029694 A1 | 3/2002 | Wong |
| 2003/0019031 A1 | 1/2003 | Mosis |
| 2003/0153059 A1 | 8/2003 | Pilkington et al. |
| 2005/0011364 A1 | 1/2005 | Chen et al. |
| 2005/0103213 A1 | 5/2005 | Dumm |
| 2005/0160917 A1 | 7/2005 | Gantt et al. |
| 2008/0000357 A1 | 1/2008 | Yang et al. |
| 2008/0282897 A1 | 11/2008 | Webster et al. |
| 2009/0007796 A1 | 1/2009 | Ricotti |
| 2009/0229471 A1 | 9/2009 | Lun et al. |
| 2009/0246341 A1 | 10/2009 | Pitner et al. |
| 2010/0064900 A1 | 3/2010 | Reyhanloo |
| 2010/0107887 A1 | 5/2010 | Bentley et al. |
| 2010/0236949 A1 | 9/2010 | Vacca et al. |
| 2010/0313765 A1 | 12/2010 | Hale |
| 2011/0246091 A1* | 10/2011 | Fedele ............... G01N 21/4133 702/25 |
| 2011/0268846 A1 | 11/2011 | Nair et al. |
| 2012/0310413 A1* | 12/2012 | Bluck ............... G06N 99/005 700/266 |
| 2013/0202487 A1 | 8/2013 | Gorelik et al. |
| 2014/0017354 A1 | 1/2014 | Joseph et al. |
| 2014/0092706 A1 | 4/2014 | Ishii |
| 2014/0234482 A1 | 8/2014 | Kempfert |
| 2014/0287129 A1 | 9/2014 | Hutcheson et al. |
| 2015/0000530 A1 | 1/2015 | Mitchell et al. |
| 2015/0000531 A1 | 1/2015 | Mitchell et al. |
| 2015/0000532 A1 | 1/2015 | Mitchell et al. |
| 2015/0161871 A1 | 6/2015 | Kim |
| 2015/0257573 A1 | 9/2015 | Gabara |
| 2016/0075979 A1 | 3/2016 | Mitchell |
| 2016/0272927 A1 | 9/2016 | Mitchell |
| 2016/0272928 A1 | 9/2016 | Mitchell |
| 2017/0022462 A1 | 1/2017 | Mitchell et al. |
| 2017/0029752 A1 | 2/2017 | Mitchell et al. |
| 2017/0051236 A1 | 2/2017 | Mitchell |
| 2017/0130177 A1 | 5/2017 | Geiger |
| 2017/0130178 A1 | 5/2017 | Mitchell |
| 2017/0321810 A1 | 11/2017 | Geiger |
| 2018/0057778 A1 | 3/2018 | Mitchell |
| 2018/0171273 A1 | 6/2018 | Mitchell et al. |

FOREIGN PATENT DOCUMENTS

| | | |
|---|---|---|
| WO | 2015173037 A1 | 11/2015 |
| WO | 2016057981 A1 | 4/2016 |

OTHER PUBLICATIONS

Jeff Flowers, How to Raise the ABV of Your Homebrew, May 1, 2014, https://learn.kegerator.com/raising-abv/ (accessed Mar. 1, 2018) , pp. 1-10.*
Brewtarget user manual, available online at least by Feb. 22, 2014; see screen capture by Wayback Machine, hereinafter "Brewtarget", see also https://www.youtube.com/watch?v=4XkmKfuKT1E, Philip G. Lee (exact date unknown).*
Screen capture by Wayback Machine of Brewtarget user manual, pp. 1-13, availible on at least Feb. 22, 2014, pp. 1-34.*
Aurora Haley, "Icon Usability" published Jul. 27, 2014, Nielsen Norman Group, 8 pages.
BeerSmith 2 (www.youtube.com/watch?v=68t9_IK-4vY) published Jun. 5, 2011 and accessed Mar. 5, 2018.
BeerTools Pro 1.5 Brewing Software in (www.youtube.com/watch?v=REgYNF_3SZc) published online Mar. 21, 2011 and accessed Mar. 5, 2015.
International Search Report, Intellectual Property Office of Singapore, PCT/IB2017/052677, Feb. 8, 2017.
Ken Schwartz, Son of Fermentation Chiller or, "Better Late than Never . . . ", pp. 1-14, 1997.
Written Opinion of ISA Intellectual Property Office of Singapore, PCT/IB2017/052677, dated Feb. 8, 2017.
Homebrewing Beta, stackexchange.com, https://homebrew.stackexchange.com/questions/15089/what-makes-a-beer-malty-and-sweet, viewed Jan. 21, 2019.

* cited by examiner

SOFTWARE TUNING OF RECIPES FOR BEER BREWING SYSTEM

BACKGROUND

Beer making has been practiced for many years. Sugars are extracted from malted grains through a process called mashing. The sugars are boiled with hops, and the resultant wort is fermented with yeast. There are many styles of beers, each of which has is its particular character. The characteristics of a beer may be affected by many different adjustments of the mashing process, the boiling process, yeast characteristics, as well as other changes to the brewing process.

Automated or semi-automated beer brewing systems may have programmable controls for all or some portion of a brewing procedure. Some such systems may automate some or all of the mashing procedure, others may automate some or all of the boiling procedure. Such systems may include systems commonly known as recirculating infusion mash systems (RIMS) heat exchanger recirculating mash systems (HERMS), and others.

A typical characteristic of such automated or semi-automated beer brewing systems is that a programmable controller may execute a recipe program that may define a portion of the brewing process. For example, a system with automated mashing may follow a mash schedule that may heat water, add the heated water to grains, and control the temperature of the water/grain mash. In many cases, such a mashing schedule may hold at a first temperature for a designated time, adjust the temperature to a second temperature and hold for a second time, and so on. In the case of mashing, each temperature and hold time may cause certain enzymes to break down starches in the grains into different types of sugars, as well as other reactions. These reactions may cause different taste effects to occur in the resulting beer.

SUMMARY

A beer making system may modify a beer making recipe to adjust sensory characteristics of a desired beer. With a given ingredient list and starting recipe, a performance model of a brewing system may be used to generate an updated recipe when given a target set of desired sensory characteristics of a desired beer. A user interface may permit a user to adjust characteristics such as thin/thick mouthfeel, dryness/maltiness, hops bitterness, hops flavor, hops aroma, and other characteristics. An updated recipe may then change mashing schedules, boiling schedules, or other programmatically controlled aspects of a brewing system. The performance model may include standard calculations and heuristics as well as performance metrics derived from observing previous brewing sessions on one or multiple devices.

An automated or semi-automated beer brewing system may adjust a brewing session based on data collected during the brewing session. The adjustments may attempt to achieve a set of desired taste characteristics, even though a brewing session may then deviate from an intended recipe. A performance model of the brewing system may include taste characteristic effects and operational aspects of an automated brewing system, and may be used to calculate changes to various brewing steps. A control system may analyze various measured parameters to determine deviation from an intended recipe, and may use the performance model to calculate updated brewing steps that may attempt to achieve the desired result. When such measured parameters indicate a malfunction, a brewing session may be paused or terminated.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

BRIEF DESCRIPTION OF THE DRAWINGS

In the drawings,

FIG. 5 is not to scale.

FIG. 6 is not to scale.

FIG. 8 is not to scale.

DETAILED DESCRIPTION

Figure 1:
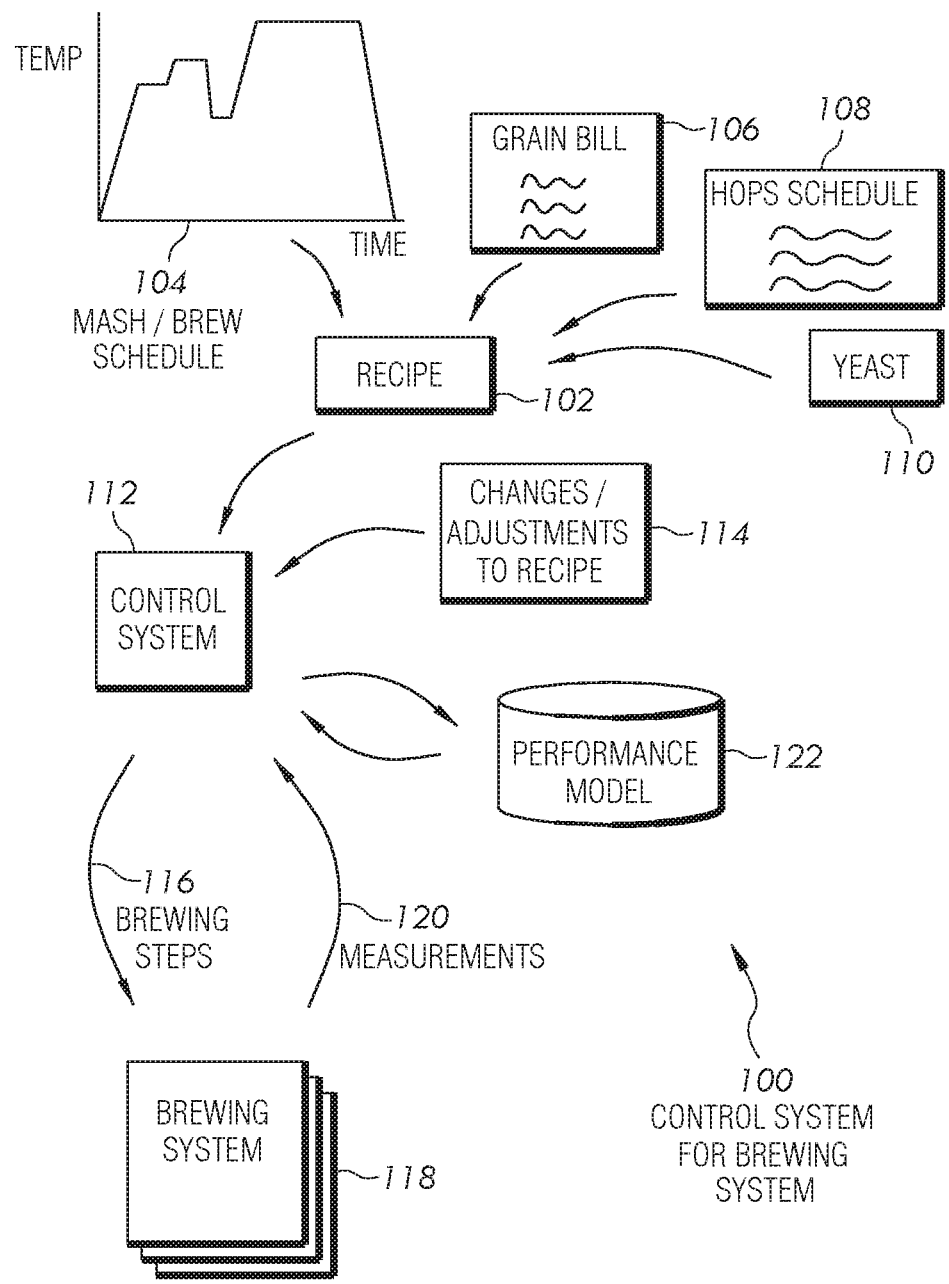
FIG. 1 is a diagram illustration of an embodiment showing control system for brewing systems.

A beer brewing system may have a programmable controller that may cause at least a portion of a beer brewing process to be automated. The programmable controller may execute a brewing recipe that may include either or both of mashing or boiling in the manufacture of wort. A recipe generator may generate brewing steps that may be executed by the programmable controller.

The recipe generator may adjust a recipe to reflect adjustments to various taste characteristics. In many cases, the recipe generator may be capable of adjusting taste characteristics given a fixed set of brewing ingredients.

For example, a user may select a baseline recipe for a type of beer. The baseline recipe may include a grain bill, hops schedule, yeast, and other ingredients to the beer. From the baseline recipe, a control system may be able to generate a set of brewing steps that, when executed, may generate the baseline beer.

The user may select adjustments to the baseline recipe through a user interface. The adjustments may include dry/maltiness, thick/thin mouthfeel, and various hops characteristics, such as bitterness, flavor, and aroma. The recipe may change various mashing steps, boiling steps, or other programmatically controlled variables to achieve the user's requested adjustments.

The adjustments may allow a user to change the outcome of a brewing session by changing the operational parameters of a brewing system without changing the ingredient list. Such a system may allow customization and personalization of a batch of beer in a simple, easy to use manner.

A recipe generator may further be used to generate multiple beer recipes from a common ingredient list. For example, a specific style of beer may be defined with a common ingredients list. Using the common ingredients list, a beer judge or other expert may attempt to match the flavor of examples of the style by changing the flavor characteristics of the baseline recipe. Using the recipe generator, drastically different beers may be generated from a starting ingredient list.

A recipe generator may use a performance model of a brewing system to calculate adjustments to brewing steps to meet a desired set of characteristics of a beer. The performance model may consist of multiple components, including heuristic and other guidelines that may be derived from human experts, as well as numerical and other measured data that may be collected from previous brewing sessions.

The performance model may include mathematical models of operational aspects of a brewing system. In a simple example, the temperature rise of brewing liquid while heating may be characterized by measuring multiple brewing sessions, with each brewing session generating several sets of measured parameters. After measuring multiple brewing sessions, a performance model of the temperature rise may be generated using regression or other statistical analysis. In some cases, the brewing sessions may be gathered from a single system or from multiple systems.

The performance model may include a model that may predict flavor characteristics based on mashing and boiling schedules. In some cases, various characteristics of beer may be defined using numerical values, such as the hops bitterness that may be defined using International Bittering Units (IBU), the Lovibond scale or Standard Reference Method (SRM) for color, original gravity (OG) or the BRIX scale for sugar content, and other factors. In many cases, these and other factors may be mathematically related to the brewing process steps in the performance model.

A control system may make changes to a brewing session by adjusting brewing steps to compensate for measured deviations from an intended brewing sequence. The control system may detect an offset from an expected measurement, then may use a performance model to calculate adjusted brewing steps. The adjusted brewing steps may be calculated to produce a similar beer to that originally intended, based on desired characteristics, including flavor characteristics.

The control system may receive measured parameters during a brewing session. When the measured parameters deviate from expected values, the control system may determine whether the deviation indicates an error condition that may prevent a successful brewing session completion. When the deviation is not determined to be an error condition, adjustments may be made to the brewing session.

The control system may enable a brewing system to produce consistent quality beers from one session to another even though there may be differences in performance during the brewing session. Such a system may ensure consistent performance from one brewing system to another when multiple systems are deployed in the field, as well as consistent performance even though a brewing system may change over time or operate under different conditions. Such a system may tolerate a large variability in hardware while still producing consistent, high quality beers.

Throughout this specification, like reference numbers signify the same elements throughout the description of the figures.

When elements are referred to as being "connected" or "coupled," the elements can be directly connected or coupled together or one or more intervening elements may also be present. In contrast, when elements are referred to as being "directly connected" or "directly coupled," there are no intervening elements present.

In the specification and claims, references to "a processor" include multiple processors. In some cases, a process that may be performed by "a processor" may be actually performed by multiple processors on the same device or on different devices. For the purposes of this specification and claims, any reference to "a processor" shall include multiple processors, which may be on the same device or different devices, unless expressly specified otherwise.

When elements are referred to as being "connected" or "coupled," the elements can be directly connected or coupled together or one or more intervening elements may also be present. In contrast, when elements are referred to as being "directly connected" or "directly coupled," there are no intervening elements present.

The subject matter may be embodied as devices, systems, methods, and/or computer program products. Accordingly, some or all of the subject matter may be embodied in hardware and/or in software (including firmware, resident software, micro-code, state machines, gate arrays, etc.) Furthermore, the subject matter may take the form of a computer program product on a computer-usable or computer-readable storage medium having computer-usable or computer-readable program code embodied in the medium for use by or in connection with an instruction execution system. In the context of this document, a computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. By way of example, and not limitation, computer readable media may comprise computer storage media and communication media.

Computer storage media includes volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can accessed by an instruction execution system. Note that the computer-usable or computer-readable medium could be paper or another suitable medium upon which the program is printed, as the program can be electronically captured, via, for instance, optical scanning of the paper or other medium, then compiled, interpreted, of otherwise processed in a suitable manner, if necessary, and then stored in a computer memory.

When the subject matter is embodied in the general context of computer-executable instructions, the embodiment may comprise program modules, executed by one or more systems, computers, or other devices. Generally, program modules include routines, programs, objects, components, data structures, etc. that perform particular tasks or implement particular abstract data types. Typically, the functionality of the program modules may be combined or distributed as desired in various embodiments.

FIG. 1 is a diagram illustration of an embodiment 100 showing a control system for a brewing system. A control system 112 may execute a recipe 102 with a brewing system 118. Embodiment 100 is merely one example of a system that may adjust recipes to match user adjustments, as well as to monitor and control a brewing system to meet a set of desired characteristics for a beer.

Embodiment 100 illustrates various functional elements of a beer brewing control system. The control system 112 may serve two major functions: before starting a brewing session, the control system 112 may modify various components of a recipe 102 to meet changes or adjustments 114 that a user may wish to make to the resulting beer. In a second function, the control system 112 may monitor a brewing system 118 during execution, and may make changes to various brewing steps in order to compensate for the brewing system performance yet still yield a beer with the desired qualities.

A recipe 102 may be composed of several components, including a mashing and brewing schedule 104, a grain bill 106, a hops and adjunct schedule 108, and a yeast 110. A recipe 102 may also include other adjuncts or additives, processing steps, or other components. A mashing and brewing schedule 104 is an illustration of the processing steps for grain mashing and boiling. In some embodiments, such a schedule may be separated into separate mashing and boiling schedules, depending on the automation capabilities of the brewing system.

A grain bill 106 may list the grains and adjuncts that may be present during the mashing portion of wort manufacturing. A typical grain bill may have malted barley, wheat, oats, rice, corn, or other grains, as well as adjuncts, additives, extracts, or other ingredients. In a typical mashing operation, ingredients of the entire grain bill may be added to a mashing vessel, then water may be added and the temperature controlled to break down starches in the grains into various sugars. The sugars and other components may be extracted into wort and the spent grains subsequently discarded.

A hops schedule 108 may define the hops and other additives to be used during a boil portion of wort manufacture. The hops schedule 108 may define which amounts and varieties of hops may be added at different points during a boil operation. Typically, hops for bitterness may be added early in a boil operation, flavor hops may be added in the middle, and aroma hops added at the end. The hops schedule 108 may also define other additives, such as flavor extracts, herbs, or other additives, as well as when those additives may be added to the wort.

A recipe 102 may begin with a baseline recipe to which various changes or adjustments 114 may be made. The changes or adjustments 114 may be customizations that may be made to the recipe 102 to change the characteristics of the resultant beer. A control system 112 may use a performance model 122 to calculate changes to ingredients or to the mashing and brewing schedule 104 to achieve desired characteristics of the resultant beer.

The control system 112 may transmit brewing steps 116 to a brewing system 118, which may execute the recipe 102. During execution, the brewing system 118 may take various measurements 120, which may be analyzed by the control system 112. When the measurements 120 may indicate that an error may occur, the control system 112 may cause the brewing system 118 to pause or stop operations. When the measurements 120 may indicate that the desired beer may still be attainable with modifications to the brewing steps 116, the control system 112 may update the brewing steps 116 and continue the brewing process.

The brewing system 118 may be any type of brewing system that may have a programmable controller that may execute the brewing steps 116. Some brewing systems may have controllers that monitor and control a portion of a mashing sequence, others may monitor and control a portion of the boiling sequence, and still others may monitor and control both mashing and boiling.

Figure 2:
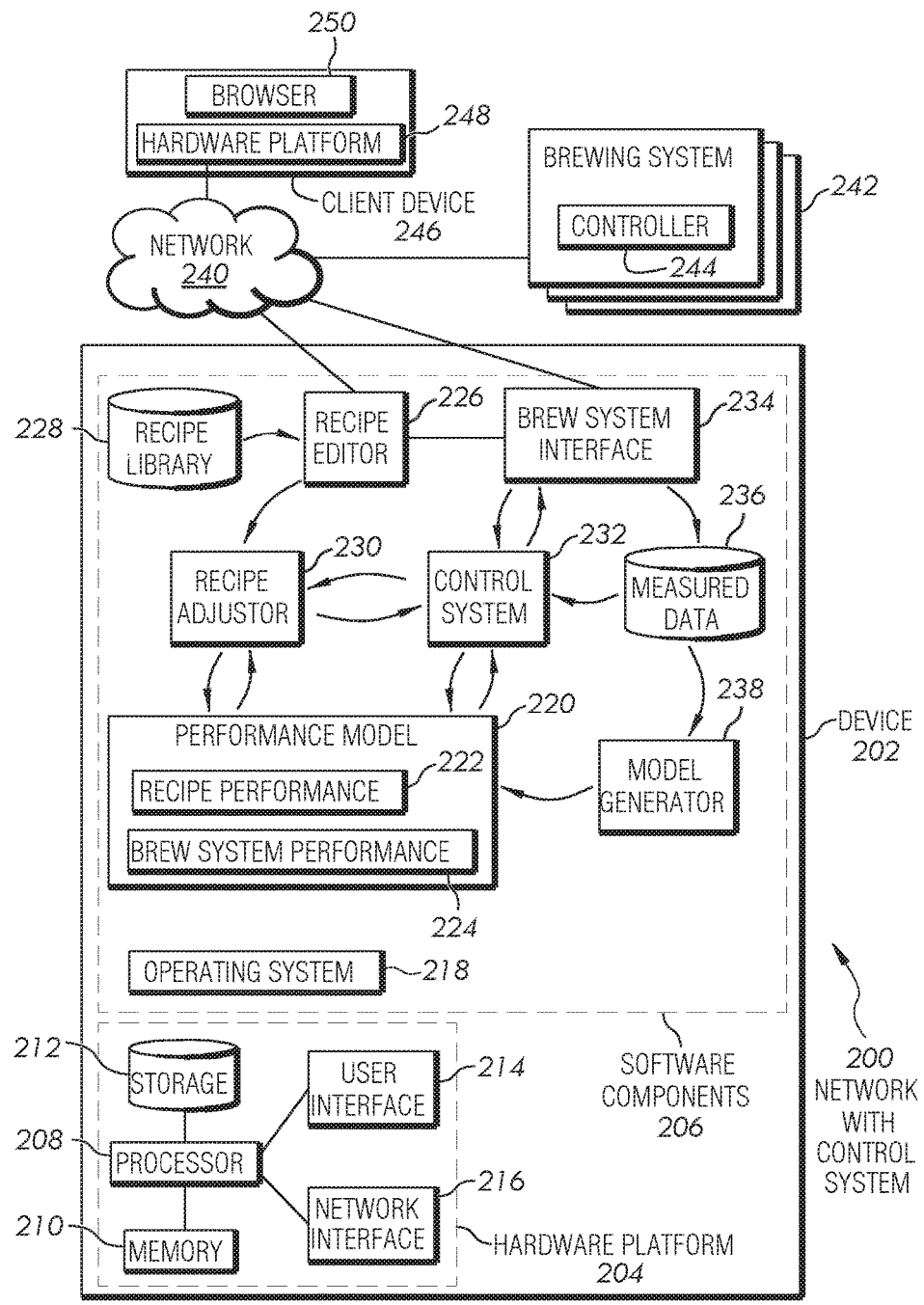
FIG. 2 is a diagram illustration of an embodiment showing a schematic or functional representation of a network with a control system.

FIG. 2 is a diagram of an embodiment 200 showing components that may manage recipes and brewing systems using a performance model. The components are illustrated as being connected across a network 240.

The diagram of FIG. 2 illustrates functional components of a system. In some cases, the component may be a hardware component, a software component, or a combination of hardware and software. Some of the components may be application level software, while other components may be execution environment level components. In some cases, the connection of one component to another may be a close connection where two or more components are operating on a single hardware platform. In other cases, the connections may be made over network connections spanning long distances. Each embodiment may use different hardware, software, and interconnection architectures to achieve the functions described.

Embodiment 200 illustrates a device 202 that may have a hardware platform 204 and various software components. The device 202 as illustrated represents a conventional computing device, although other embodiments may have different configurations, architectures, or components.

In many embodiments, the device 202 may be a server computer. In some embodiments, the device 202 may still also be a desktop computer, laptop computer, netbook computer, tablet or slate computer, wireless handset, cellular telephone, game console or any other type of computing device. In some embodiments, the device 202 may be implemented on a cluster of computing devices, which may be a group of physical or virtual machines.

The hardware platform 204 may include a processor 208, random access memory 210, and nonvolatile storage 212. The hardware platform 204 may also include a user interface 214 and network interface 216.

The random access memory 210 may be storage that contains data objects and executable code that can be quickly accessed by the processors 208. In many embodiments, the random access memory 210 may have a high-speed bus connecting the memory 210 to the processors 208.

The nonvolatile storage 212 may be storage that persists after the device 202 is shut down. The nonvolatile storage 212 may be any type of storage device, including hard disk, solid state memory devices, magnetic tape, optical storage, or other type of storage. The nonvolatile storage 212 may be read only or read/write capable. In some embodiments, the nonvolatile storage 212 may be cloud based, network storage, or other storage that may be accessed over a network connection.

The user interface 214 may be any type of hardware capable of displaying output and receiving input from a user. In many cases, the output display may be a graphical display monitor, although output devices may include lights and other visual output, audio output, kinetic actuator output, as well as other output devices. Conventional input devices may include keyboards and pointing devices such as a mouse, stylus, trackball, or other pointing device. Other input devices may include various sensors, including biometric input devices, audio and video input devices, and other sensors.

The network interface 216 may be any type of connection to another computer. In many embodiments, the network interface 216 may be a wired Ethernet connection. Other embodiments may include wired or wireless connections over various communication protocols.

The software components 206 may include an operating system 218 on which various software components and services may operate.

A performance model 220 may be an expression of interactions and relationships between ingredients and processing variables that may produce beers. The expression may take many forms, including heuristics, rules, formulas, algorithms, and other expressions that may be used to determine changes to recipes and steps performed by brewing systems to meet desired characteristics of a resulting beer.

The performance model 220 may include a recipe performance model 222 that may model effects of ingredients and processing information to predict the characteristics of a beer, as well as a brew system performance model 224. Using the performance model 220, a system may be able to calculate an ingredient list and processing steps to meet a desired beer's specification and parameters.

In one use case, an ingredient list may be predetermined, and the performance model 220 may be used to calculate processing steps that may attempt to match a set of desired characteristics. An example may be that a user has a set of ingredients and may be preparing to brew a batch of beer, but the user may wish to have a thicker mouthfeel and less bitterness in the batch. The performance model 220 may be able to hold the ingredient list constant, and make adjustments to the brewing steps to achieve the user's request.

The recipe performance model 222 may be a portion of the performance model 220 that may determine effects of ingredients and processing steps to the resulting beer. The brew system performance model 224 may be a portion of the performance model 220 that may predict expected performance metrics of a given brewing system.

The brew system performance model 224 may contain a statistical model of brewing systems and may predict various performance aspects of a brewing system. Such a model may be useful to estimate performance characteristics that may be used by a recipe model to predict the characteristics of a resulting beer. In one use example, the brew system performance model 224 may predict the rate at which temperature rises or falls when heat may be added or removed from the system. Such a rate may be used to generate a mash schedule, which may be analyzed by the recipe performance model to predict beer characteristics.

The brew system performance model 224 may be used during a brewing session to determine error conditions or to make adjustments to the brewing session. The brew system performance model 224 may generate an expected system behavior, then a control system may compare the expected system behavior to an observed or measured system behavior. When there is a deviation, a control system may abort, pause, or continue the system operation. In some cases, the control system may make changes to the brewing session to attempt to meet a user's desired characteristics.

A statistical model in a brew system performance model 224 may be constructed from measurements from many brewing sessions. In some cases, the same brewing system may be used for each brewing session, while in other cases, different brewing systems may be used. When multiple brewing systems are used, the brewing systems may be identical, similar, or have widely varying characteristics. Such a statistical model may be useful to predict the performance of a new brewing system with some certainty, even though the new brewing system may not have been used before. Such a system may also be updated as new brewing sessions are captured from various brewing systems.

In some cases, a statistical model may be trained by presenting one or more examples of specific scenarios to a model generator 238 used to generate the models. For example, a scenario may include operating a brewing system with a hose disconnected, with a failing heat exchanger, or with some other condition. The model may be trained with such scenarios and may be used to identify the scenarios as they occur. Once identified, a user notification may be sent to correct the situation and continue brewing, for example.

A recipe editor 226 may be an application through which a user may select a recipe from a recipe library 228 and may edit or adjust the recipe. In some cases, the recipe editor 226 may allow a user to construct a new recipe from scratch. A typical recipe editor 226 may generate a grain bill, hops schedule, yeast selection and schedule, and other ingredients and additions. The recipe editor 226 may also generate brewing process parameters, such as a mashing schedule, boiling schedule, fermentation schedule, and other parameters.

A recipe adjuster 230 may make adjustments to a given recipe using the performance model 220. In one use scenario, a user may wish to adjust a recipe for certain flavor and taste characteristics. The recipe adjuster 230 may attempt to change the processing parameters of the recipe to meet the user's selected characteristics while keeping the ingredient list the same. The recipe adjuster 230 may generate a new set of brewing steps that may customize the recipe by controlling and operating a brewing system in a different manner. In a simple example, a user may desire a higher maltiness in a beer, and the recipe adjuster 230 may adjust the mashing schedule to increase alpha amylase extraction.

A brew system interface 234 may communicate across a network 240 to a brewing system 242. The brew system interface 234 may transmit a recipe to the brewing system 242, and the brewing system controller 244 may execute the recipe. The brew system interface 234 may receive measurements and status updates from the brewing system 242 while the recipe executes.

A control system 232 may receive status updates and measurements through the brew system interface 234. The measured data 236 may be analyzed by the control system 232 during a brewing session for anomaly detection and for making changes to a brewing session when a deviation is identified.

The control system 232 may detect anomalies during a brewing session. An anomaly may be severe, where the brewing session may be aborted. In some cases, an anomaly may be a condition where the brewing session may be paused and a user may be alerted to correct a situation. In other cases, an anomaly may be identified but the brewing session may continue. In still other cases, a control system 232 may attempt to rectify the situation by changing brewing steps to still yield a desired beer.

The brewing system 242 may be any type of brewing system with a programmable controller 244. In some cases, the programmable controller 244 may be used to control the entire brewing process, while in other cases, the programmable controller 244 may be configured to manage a subset of the brewing process. In a typical example, the controller 244 may be used to control mashing, boiling, or both mashing and boiling.

The device 202 is illustrated as a single device operating on a hardware platform. In some cases, the device 202 may be a cloud service that may provide the various operations, and a user may access such a service using a client device 246, which may have a hardware platform 248 on which a browser 250 or other application may execute. Such a client device 246 may be separate from the brewing system 242 in some cases. In other cases, the brewing system 242 may have a user interface through which the various services illustrated on device 202 may be accessed.

Figure 3:
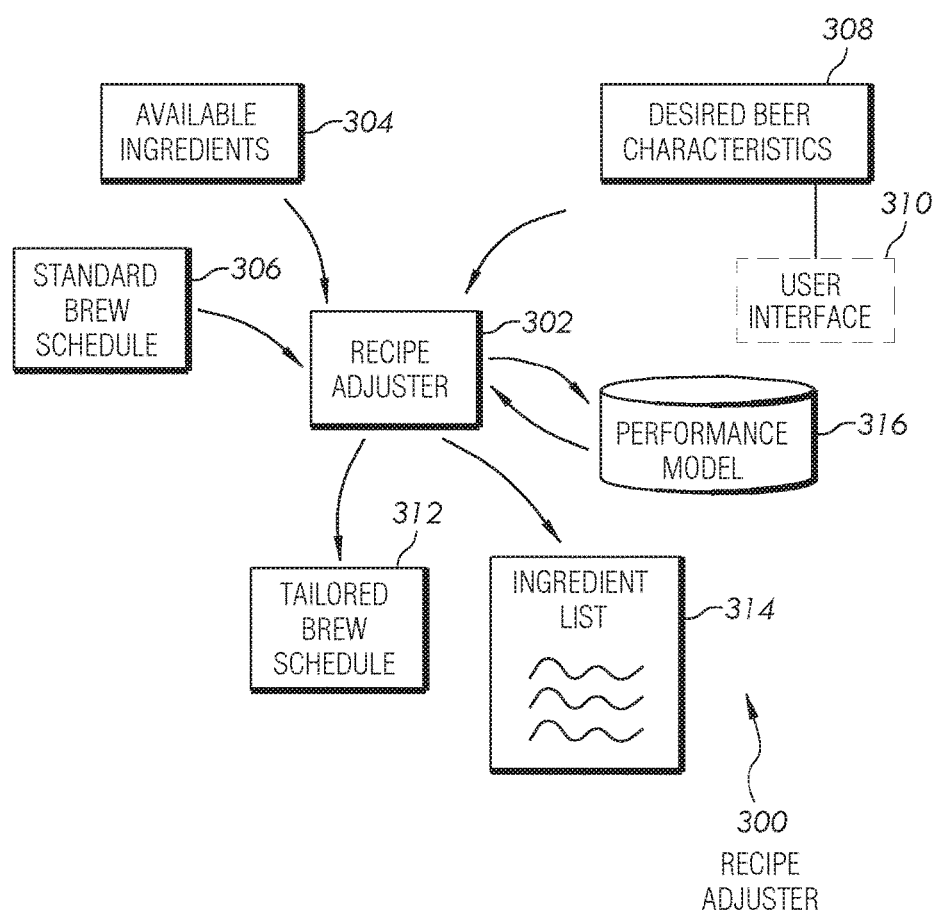
FIG. 3 is a diagram illustration of components that may make up a recipe adjuster.

FIG. 3 is a diagram illustration of an example embodiment 300 showing a recipe adjuster 302. Embodiment 300 can be used to illustrate several manners in which a recipe adjuster 302 may be used prior to brewing.

The recipe adjuster 302 may receive available ingredients 304 and a standard brew schedule 306. In a typical use case, the ingredient list and brew schedule may be defined through a recipe in a library or through a user who may use a recipe editor.

The recipe adjuster 302 may be able to determine a baseline set of beer characteristics given an ingredient list and brew schedule. The beer characteristics may be calculated using a performance model 316.

A set of desired beer characteristics 308 may be generated through a user interface 310. The desired beer characteristics 308 may be used to create a tailored or updated brew schedule 312 and, in some cases, an updated ingredient list 314.

One use scenario for a recipe adjuster 302 is to begin with a fixed ingredient list 304 and create a customized beer by varying the brew schedule 312 to meet a set of desired beer characteristics 308. Such a scenario may be implemented as a customizer for a consumer level brewing system, where a consumer may craft their beer to suit their individual tastes.

In another use case, a standard ingredient list may be used to generate several different beers. The recipe adjuster 302 may receive several different sets of beer characteristics 308, and may generate tailored brew schedules 312 for each of the sets of beer characteristics. Such a scenario may be useful when a beer judge or expert may classify three or four similar commercial beers based on their characteristics, then use a common ingredient list to generate tailored brew schedules that mimic the commercial beers. Then, a consumer may purchase a single set of ingredients and using a programmable brewing system, may be able to select from and replicate the commercial beers using the tailored brew schedules.

In still another use case, a brewer may have a certain set of available ingredients and the recipe adjuster 302 may be able to substitute the available ingredients into a recipe to generate a desired beer. For example, a brewer may have a dark roasted malt and may wish to make a recipe that may call for a medium roasted malt. The recipe adjuster 302 may be able to adjust the quantity of dark roasted malt lower and increase the quantity of another grain to achieve the desired color and taste profile of the resulting beer. The recipe adjuster 302 may also adjust the brewing parameters to achieve the desired characteristics of the resulting beer. In such an example, a brewer may be able to make a desired beer even when the precise ingredients may be not be available.

Figure 4:
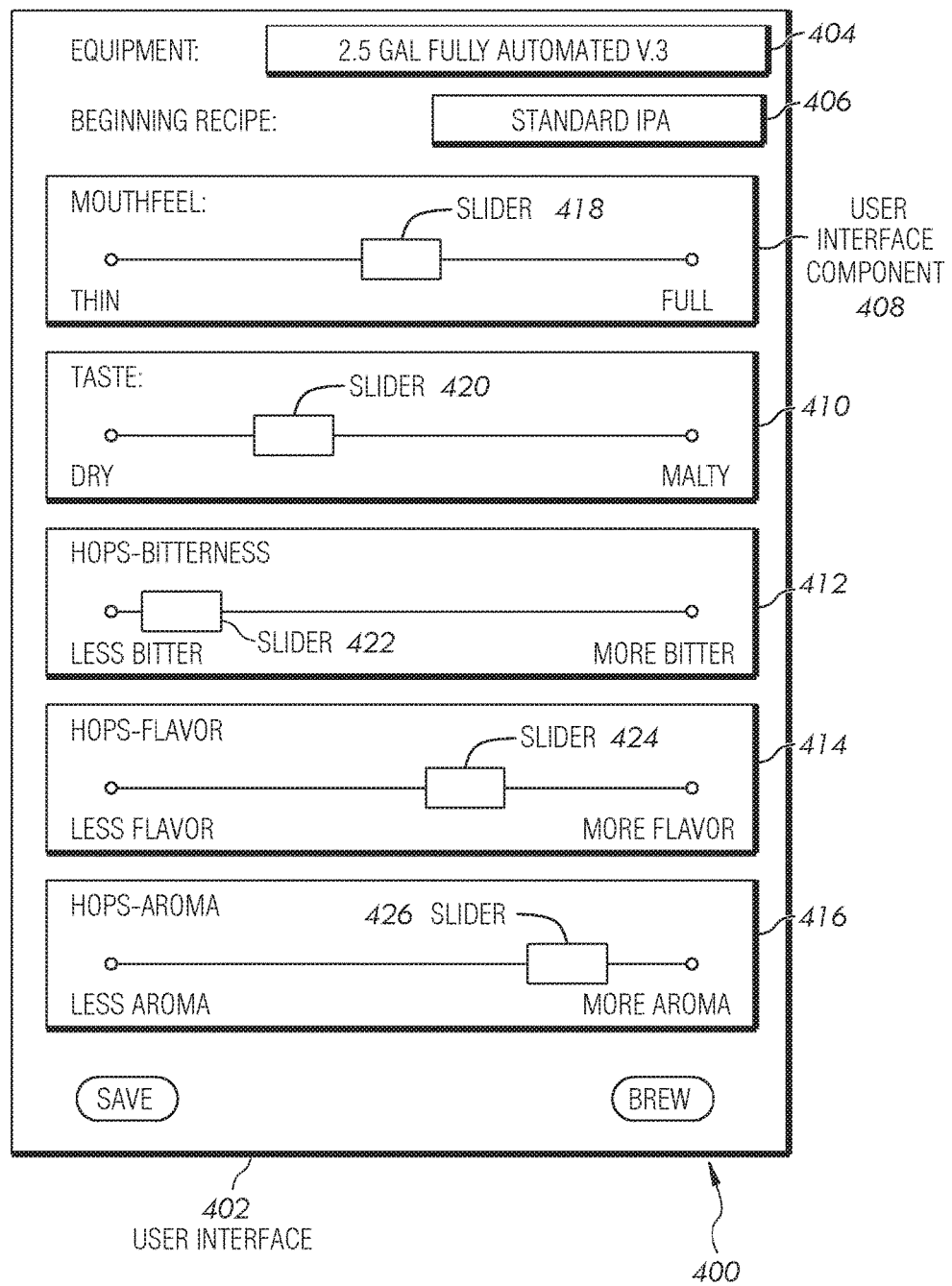
FIG. 4 is a diagram illustration of an embodiment showing an example user interface for adjusting recipes.

FIG. 4 is a diagram illustration showing an example embodiment 400 that shows an example user interface 402 through which a user may modify a brewing recipe. The user interface 402 illustrates merely one mechanism by which a user may tailor a beer to be made using a programmable brewing system.

The user interface 402 may be one mechanism by which a user may input changes to a brewing recipe, and in many cases, the changes may be implemented by changing or modifying brewing steps without modifying a set of ingredients for a batch of beer. A user may adjust various taste parameters of a beer, and a recipe adjuster may use a performance model to modify mashing schedules, boiling schedules, or make other adjustments to achieve a user's desired set of beer characteristics.

In the user interface 402, the equipment 404 and recipe 406 are illustrated. The recipe 406 may include a set of ingredients as well as a starting set of brewing steps that may make up the various brewing schedules. The user interface 402 may include a number of user interface components 408, 410, 412, 414, and 416, through which a user may adjust sliders 418, 420, 422, 424, and 426.

The example of user interface 402 contains adjustments to mouthfeel, taste, hops bitterness, hops flavor, and hops aroma. These examples are merely five examples of taste and flavor parameters that a user may adjust by changing the brewing steps using an automated brewing system.

Mouthfeel may have a user interface component 418 containing a slider 418 by which a user may be able to adjust from thin to thick. In general, mouthfeel may be affected by the amount of long chain saccharides as well as the solids in the beer. In order to increase the thickness of the beer, changes may be made to a mashing schedule to increase alpha amylase extraction. Such changes may include a section of the mashing schedule that holds the mash temperature from 156F to 170F, when the alpha amylase may be dominant. In order to make the beer more thin, the mashing schedule may be modified to emphasize beta amylase, which may be dominant at temperatures of 130 F to 148 F.

In some cases, changes to the mashing schedule may involve raising or lowering a single step infusion mash by a certain temperature. In other cases, changes to the mashing schedule may involve introducing multiple steps, where each step may emphasize certain reactions. Such changes may involve increasing or decreasing the time during a step, raising or lowering a step temperature, or a combination of both.

Taste adjustments from dry to malty may be adjusted using the user interface component 410 and slider 420. Maltiness or dryness may be affected by the amount of simple sugars or shorter chain saccharides, such as degree of polymerization (DP) of 4, 5, 6, or so. This may be achieved by changing the mashing schedule. For example, to make a beer with increase maltiness, the overall mashing schedule may be shortened to increase the amount of unfermentable sugars that may be present in the resulting beer. A request for increased dryness may be achieved by a longer mashing schedule that may convert more longer chained saccharides into fermentable sugars.

Hops bitterness may be adjusted through the user interface component 412 and slider 422. Hops bitterness may be adjusted by the length of time that bittering hops are in the boil schedule. By adding bittering hops later into a boil sequence, less bitterness will be imparted into the beer. By increasing the time the bittering hops are in the boil sequence, more bitterness may be induced. In general, bittering hops may be in a boil schedule for most, if not all, of the boil schedule, which may be 60-90 minutes or longer. In some cases, the boil schedule may be shorter than 60 minutes.

Hops flavor may be adjusted through the user interface component 414 and slider 424. Hops flavor may be adjusted by the length of time that flavor hops are in the boil schedule. In general, flavor hops may be added in the middle of a boil schedule, often with 10-30 minutes left in the schedule.

In general, boiling hops may add aroma and flavor initially, then as the hops remain in the boil, the aroma effects may boil off and be lost, while the flavor aspects may increase. As the boil progresses, the flavor effects may boil off and be lost as the bitterness aspects dominate the hops contribution to the beer wort.

The flavor effects of hops may be increased by keeping the flavor hops in the boil schedule for an optimum time, which may be 20-30 minutes, and may be minimized by either increasing past the optimum time or decreasing before the minimum time. Flavor hops that may be kept in the boil schedule longer than an optimum time may begin to contribute to the bitterness, while flavor hops that may be added later in the boil schedule may contribute more to aroma.

The interaction between the bittering, flavor, and aroma hops may illustrate one example where dependencies may exist between different flavor components. In many cases, certain characteristics of the resulting beer may not be independent of each other and changing one characteristic may cause another characteristic to change.

Hops aroma may be adjusted through the user interface component 402 and slider 416. Hops aroma may be adjusted by the length of time that aroma hops are present in the boil at the end of the boil process. Aroma may be decreased by increasing the time aroma hops are in the boil process past a certain point. In some cases, the aroma hops may be added after the boiling has completed and during a cooling step prior to pitching yeast and beginning fermentation.

Figure 5:
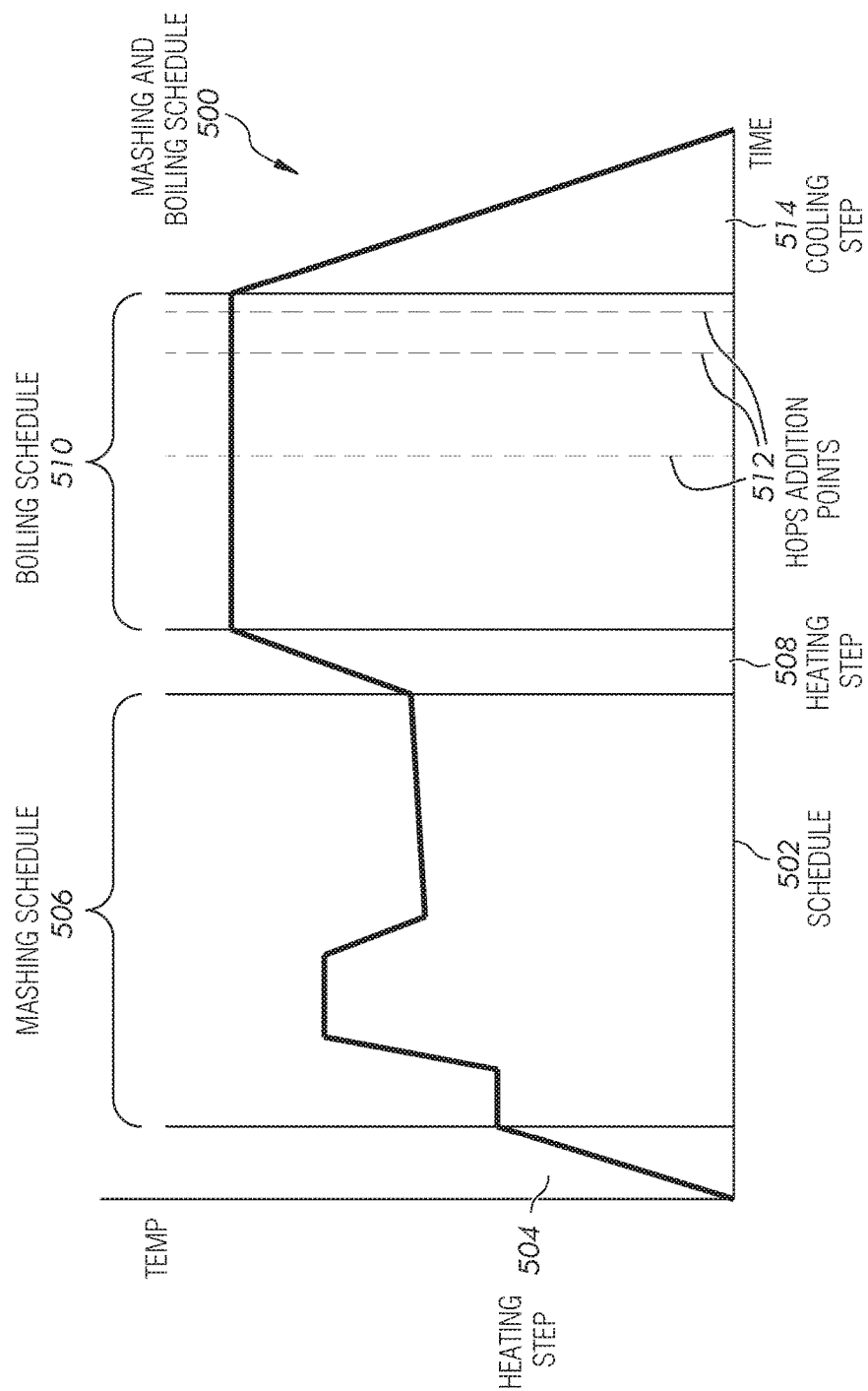
FIG. 5 is a diagram illustration of an embodiment showing a mashing and boiling schedule.

FIG. 5 is a diagram illustration of an example embodiment 500 showing a mashing and boiling schedule 502. The schedule 502 may show temperature versus time, which may reflect the temperature of the wort during production. In many systems, the wort may be transferred through various vessels, flow paths, or other processing equipment during the schedule, but such information is not illustrated here.

The schedule 502 may show a typical mashing and boiling schedule for an automated brewing system. In cases where a brewing system is configured for automatic control of both mashing and boiling, the schedule 502 may reflect the processing steps executed by the automated system. In cases where some of the brewing process is manually performed, the schedule 502 may reflect some processing steps that may be manually performed and some that may be automatically performed.

The schedule 502 may begin with a heating step 504. In many systems, the heating step 504 may involve heating water without contact between the water and grains or other ingredients.

During a mashing schedule 506, the heated water may be in contact with grains and various adjuncts, and the temperature profile may be selected to cause various enzymes to react with the starches in the grains and convert the starches into sugars.

After the mashing schedule 506, a heating step 508 may raise the wort temperature at or near the boiling temperature for a period of time. The boiling schedule 510 may keep the wort at or near the boiling point, and may include various hops addition points 512. In general, bittering hops may be added first, flavor hops added in the middle to end of the boiling schedule, and aroma hops added at the end of the boiling schedule. After completing the boiling schedule 510, a cooling step 514 may reduce the liquid temperature to a point where yeast can be pitched and fermentation begin.

Figure 6:
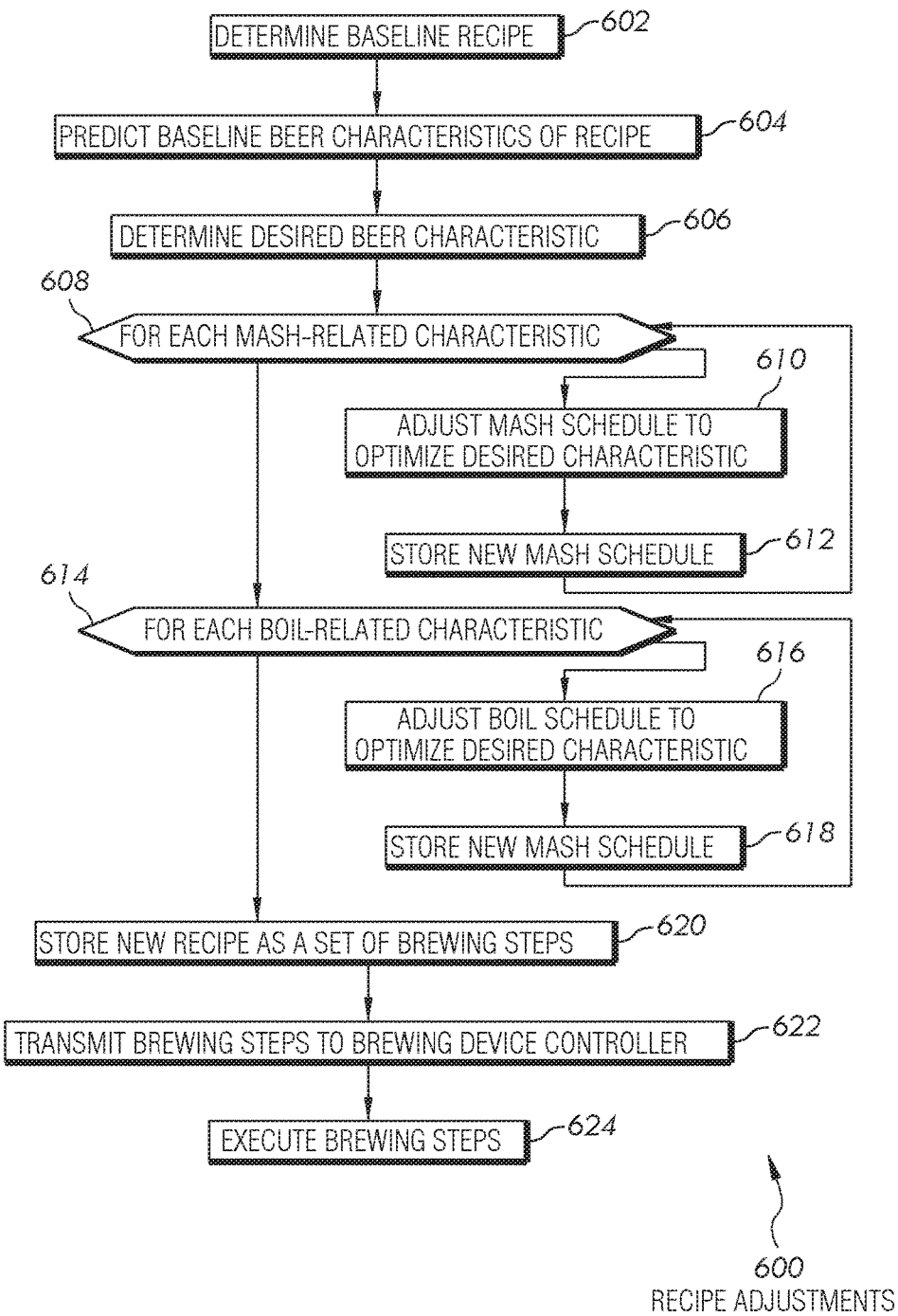
FIG. 6 is a flowchart illustration of an embodiment showing a method for making recipe adjustments.

FIG. 6 is a flowchart illustration of an embodiment 600 showing a method performed by a recipe adjuster. The method of embodiment 600 may be performed prior to executing a brewing sequence and may make changes to a brewing sequence to implement desired changes to the resultant beer given a fixed ingredient list.

Other embodiments may use different sequencing, additional or fewer steps, and different nomenclature or terminology to accomplish similar functions. In some embodiments, various operations or set of operations may be performed in parallel with other operations, either in a synchronous or asynchronous manner. The steps selected here were chosen to illustrate some principles of operations in a simplified form.

Embodiment 600 may illustrate a method for updating or changing a mashing schedule or boiling schedule to reflect desired changes to the resulting beer. Examples of changes to beer characteristics were discussed in embodiment 400.

A baseline recipe may be determined in block 602. In many cases, a user may select a baseline recipe as a representative recipe of a certain beer style, for example. The baseline characteristics of the beer may be predicted in block 604. The baseline characteristics may be predicted from a performance model that may calculate various characteristics, which may be beer color, sweetness, mouthfeel, bitterness, aroma, flavor, maltiness, and other characteristics.

A desired set of beer characteristics may be determined in block 606. In some cases, a user may modify a user interface such as exemplified in embodiment 400. In other cases, a beer characteristic may be received through other mechanisms, such as an application programming interface (API), for example.

For each mash-related characteristic in block 608, the mash schedule may be adjusted in block 610 to meet a desired characteristic. The new mash schedule may be stored in block 612. In the example of embodiment 600, the mash-related characteristics may be treated as independent characteristics, meaning that the various characteristics do not depend or interact with each other. In many cases, such an assumption may not be technically accurate, however, for a first order approximation, some embodiments may treat the characteristics as independent.

Similarly, for each boil-related characteristic in block 614, the boil schedule may be adjusted in block 616 to meet the desired characteristic. The new boil schedule may be stored in block 618.

The new recipe may be stored in block 620 as a set of brewing steps, which may be transmitted to the brewing system in block 622 and executed in block 624.

Figure 7:
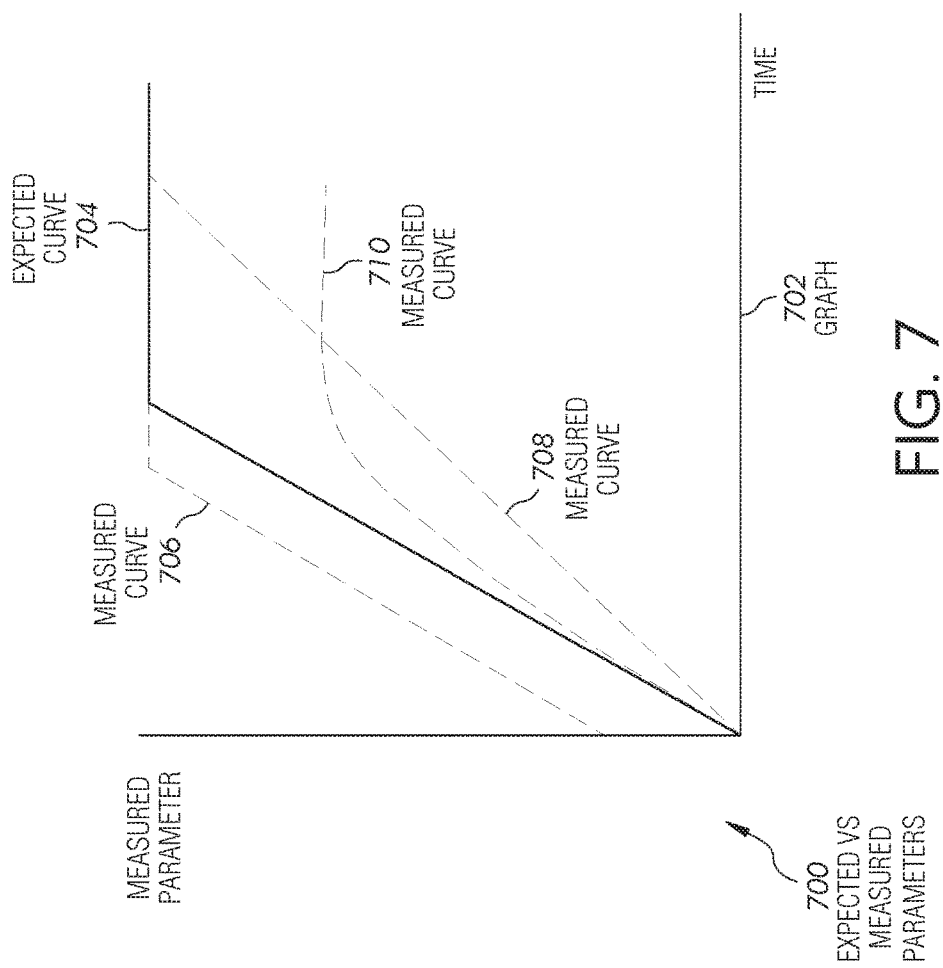
FIG. 7 is a flowchart illustration of an embodiment showing a graph of expected measured parameters.

FIG. 7 is a diagram illustration of an example embodiment 700 illustrating an expected curve 704 and various measured curves.

Embodiment 700 may graphically represent a measured parameter versus time. A measured parameter may be any parameter that an automated beer making system may produce. Examples of such parameters may include temperature, amount of heat applied, flow rates, or any other parameter. The parameters that a brewing system may be capable of measuring may be dependent on the type of brewing system and the construction and instrumentation of such a system.

In many cases, a measured parameter may be a directly measurable parameter, such as temperature. In other cases, the measured parameter may be a proxy for some other wort characteristic, such as light transmission as a proxy for amount of extracted sugar. In some cases, the measured parameter may be a first or second differential of a measured parameter, such as the rate of change of temperature or the second differential of temperature.

Regardless of the actual measured parameter, a control system may determine an expected curve 704, which may reflect the normal or expected behavior of the brewing system.

When a control system receives a measured curve representing measured data points 706, the control system may compare the measured curve 706 to the expected curve or data points 704 and determine that the two curves may be similar, and that the difference may be represented by a mathematical transformation on the expected curve 706. The control system may determine that such a transform may not adversely affect the performance of the brewing system and that the brewing system is otherwise operating normally. In such a case, the control system may continue normal operations.

When a control system receives a measured curve 708, the control system may compare the measured curve 708 to the expected curve 704 and determine that the slope of the two curves is different. The control system may evaluate the difference to determine whether or not the difference indicates an error condition or whether the remaining brewing schedule may be adjusted to compensate for the different slope. An example of such an adjustment is presented later in this specification.

When a control system receives a measured curve 710, the control system may compare the measured curve 710 to the expected curve 704 and determine that the system may have been unable to achieve the parameter value of the expected curve 704. For example, if the expected curve 704 may represent a temperature measurement, the measured curve 710 may indicate where the system was unable to achieve the desired temperature. Such a situation may occur when the system is not configured correctly, if a heating element is not functioning well, the system is not properly cleaned, or some other condition.

A performance model may be trained to recognize an improperly configured system or a system with known error conditions. For example, a brewing system may be intentionally configured with a misconfigured set of hoses. As that brewing system begins operation, a measured curve may be gathered such as measured curve 710. The performance model may be trained with several such measured curves so that a control system may be capable of identifying a poorly operating system and further identify the misconfiguration because of the similarity with the previously observed measured curves.

Figure 8:
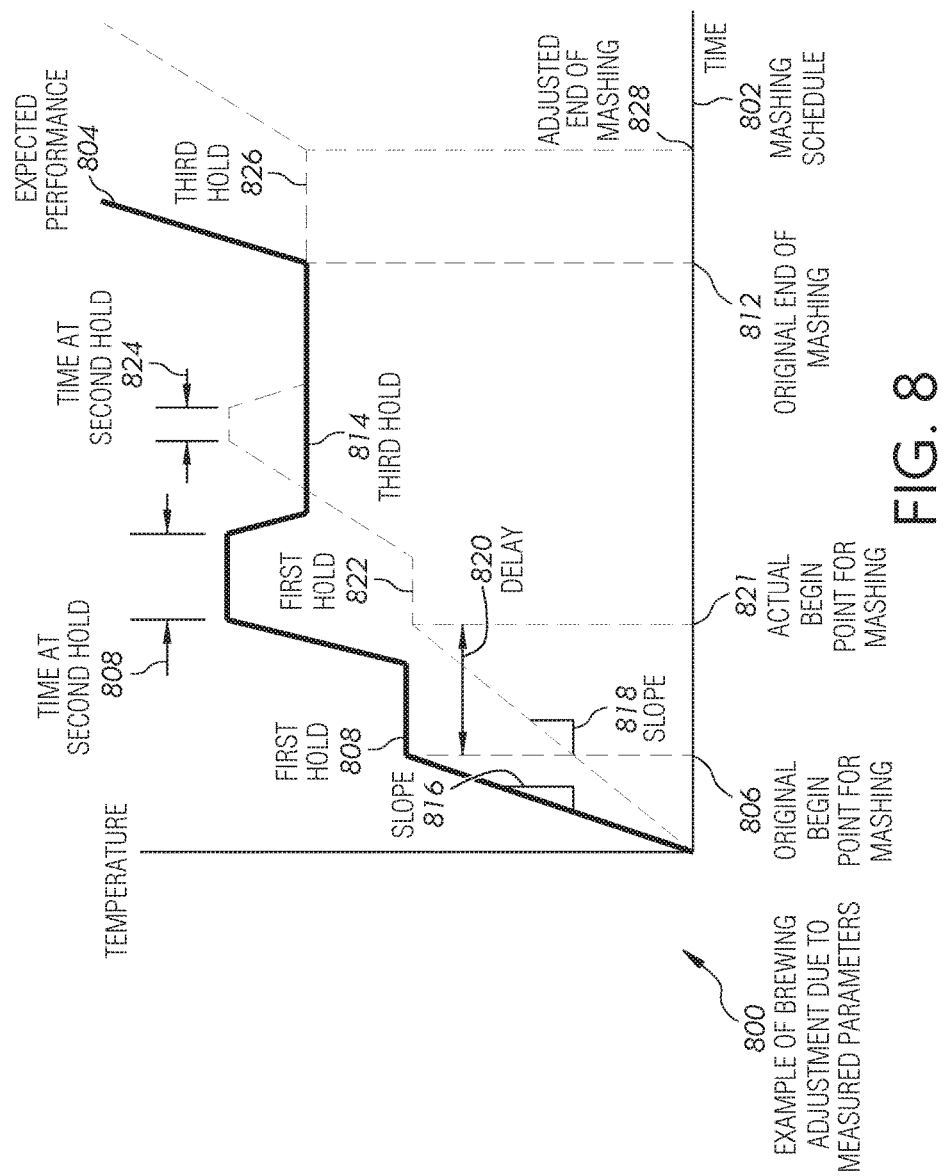
FIG. 8 is a diagram illustration of an embodiment showing an example of brewing adjustment due to measured parameters.

FIG. 8 is a diagram illustration of an example embodiment 800 showing adjustments that may be made to a mashing schedule based on measured parameters received during a brewing session. Embodiment 800 illustrates a mashing schedule 802 showing a curve exhibiting expected performance 804, measured performance, and updated changes to the brewing steps based on the measured performance.

Embodiment 800 is merely one example of how a mashing schedule may be updated to maintain desired characteristics in a resulting beer using a performance model that contains both recipe elements and brewing system performance elements.

In the example of embodiment 800, a curve showing expected performance 804 may illustrate the expected operation of a brewing system. This curve may be represented in brewing steps that may be transmitted to a brewing system and used by a processor to control the brewing system.

The expected performance 804 includes a start point for mashing 806, a first rest 808, a time at a second rest 810, an end of the mash schedule 812, which also defines a third rest 814. At the beginning of the mashing schedule, the liquid may be heated at an expected rate, and the expected rate may be defined by a slope 816.

Measured parameters during the heating phase may indicate that the actual rate of heating may be defined by the slope 818. The slope 818 may show that the system may be unable to heat liquid as fast as expected. Such a deviation from an expected value of the slope 816 may indicate that the mashing schedule may need to be adjusted.

In the example of embodiment 800, the characteristics of the resulting beer may include having a target amount of maltiness. In order to achieve the maltiness, a performance model may indicate that the overall length of time of the mashing session may be limited. The limit may ensure that the mashing process may leave some longer chain sugars in the wort, which may contribute to the maltiness of the resulting beer.

However, if the rest times of the original mashing schedule were maintained, the slower temperature rise times would cause the overall length of the mashing schedule to increase. Based on the desired characteristic of maltiness and using a performance model, the mashing schedule may be adjusted to shorten the time at the second hold 824.

The modified mashing schedule may start at a new beginning point 821, maintain a first hold 822, then transition to a second hold 824. The second hold 824 may have a reduced time from the original second hold 810 in order to maintain a desired overall length of a mashing schedule. A third hold 826 may otherwise cause the mash to end at point 828.

The example of embodiment 800 is merely one example of how a mashing schedule or brewing schedule may be updated after receiving observations about the actual performance of a brewing system. This illustration was selected to illustrate the concepts, which may be applied to many other measured parameters and many other factors that may be calculated from a performance model.

Figure 9:
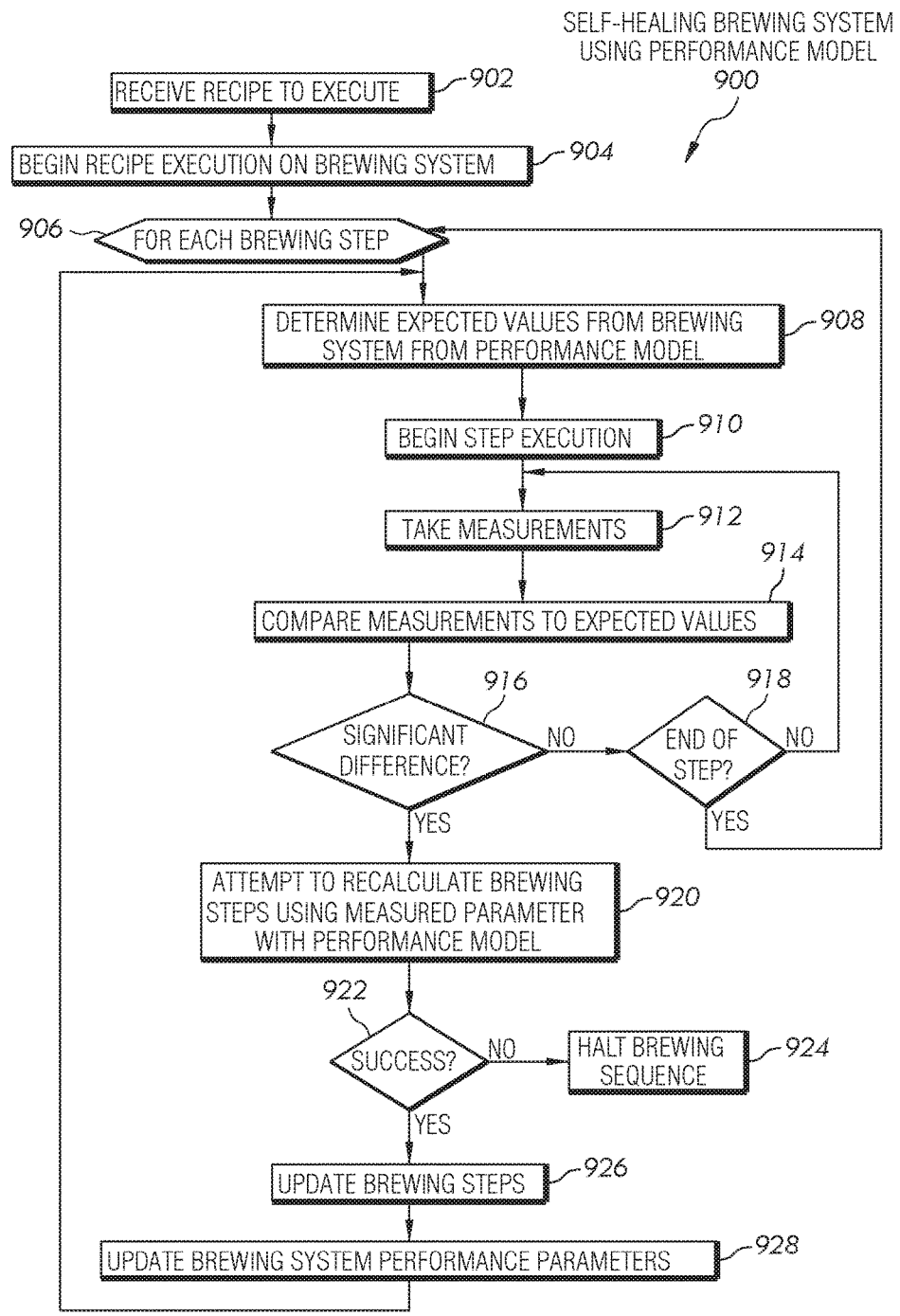
FIG. 9 is a flowchart illustration of an embodiment showing a self-healing brewing system using a performance model.

FIG. 9 is a flowchart illustration of an embodiment 900 showing a method performed by a control system where changes to brewing steps may be made during a brewing session based on measured parameters received from the brewing system.

Other embodiments may use different sequencing, additional or fewer steps, and different nomenclature or terminology to accomplish similar functions. In some embodiments, various operations or set of operations may be performed in parallel with other operations, either in a synchronous or asynchronous manner. The steps selected here were chosen to illustrate some principles of operations in a simplified form.

Embodiment 900 is a simplified version of a method that may be employed to manage a brewing system. An expected performance may be determined from analyzing a recipe using a performance model, then the expected performance may be compared to measured performance. When deviations occur from the expected performance, the subsequent brewing steps may be updated to maintain a set of desired characteristics in the resulting beer. Such an operation may allow a system to adapt to variations in brewing systems or external conditions yet still produce a beer with a set of desired characteristics.

A recipe may be received in block 902. A brewing system may begin execution of the recipe in block 904. Each brewing step may be analyzed in block 906.

For each brewing step in block 906, a set of expected values may be calculated from a performance model in block 908. The step may begin execution in block 910, and measurements may be taken in block 912. The measurements may be compared to the expected values in block 914. If there is no significant difference between the measured and expected values in block 916 and the end of the brewing step has not occurred in block 918, the process may loop back to step 912 to continue taking measurements during the brewing step.

If the difference between the measured and expected values is statistically significant in block 916, an attempt to recalculate subsequent brewing steps may be performed in block 918.

The recalculating of brewing steps in block 918 may attempt to determine a brewing sequence that may achieve characteristics of the resulting beer even though the brewing system is not performing as expected. When such a recalculation is successful in block 922, the brewing steps may be updated in block 926 and the expected brewing system performance parameters may be updated in block 928. The process may return to block 908 to recalculate the expected values for the current brewing step and continue executing the current brewing step.

If the recalculation in block 920 is not successful in block 922, the brewing sequence may be halted in block 924. In some cases, a user may be alerted to attend to the brewing system or to approve an override, where the user may approve the adjusted brewing sequence even though the system may not be able to achieve the desired characteristics of the resulting beer.

The foregoing description of the subject matter has been presented for purposes of illustration and description. It is not intended to be exhaustive or to limit the subject matter to the precise form disclosed, and other modifications and variations may be possible in light of the above teachings. The embodiment was chosen and described in order to best explain the principles of the invention and its practical application to thereby enable others skilled in the art to best utilize the invention in various embodiments and various modifications as are suited to the particular use contemplated. It is intended that the appended claims be construed to include other alternative embodiments except insofar as limited by the prior art.

What is claimed is:

1. A system comprising:
a hardware platform comprising a computer processor, said hardware platform being connected to a storage mechanism; a control system executing on said hardware platform configured to:
receive a performance model of a computer controlled beer brewing system, said performance model comprising a flavor prediction model based on mashing schedules; determine a first recipe, said first recipe having a first set of ingredients and a first mashing schedule;
calculate a first set of flavor characteristics for said first recipe using said performance model, said first set of flavor characteristics being based on a first mashing schedule, said first mashing schedule comprising a first temperature versus time curve for mashing grains;
receive a first user input to adjust a first flavor characteristic; calculate a change to said first mashing schedule to a second mashing schedule and determining a second set of flavor characteristics for said second mashing schedule, said change being calculated using said performance model and said change being made to achieve said first flavor characteristic; store said second mashing schedule as a second recipe for said computer controlled beer brewing system;
transmit said second mashing schedule in a machine readable format to said computer controlled beer brewing system such that said computer controlled beer brewing system can execute said second mashing schedule, and
wherein said first flavor characteristic being mouthfeel,
wherein said first mashing schedule comprising a first hold time at a first mash temperature and a second hold time at a second mash temperature, said first mash temperature being higher than said second mash temperature, when said first user input indicates decreasing mouthfeel, said second mashing schedule being adjusted by increasing mash time at said second mash temperature to increase beta amylase extraction.

2. The system of claim 1, said first mashing schedule comprising a first
hold time at a first mash temperature and a second hold time at a second mash temperature, said first mash temperature being higher than said second mash temperature, when said first
user input indicates increasing mouthfeel, said second mashing schedule being adjusted by increasing mash time at said first mash temperature to increase alpha amylase extraction.

3. The system of claim 1, said control system further configured to:
determine an expected final gravity measurement for said second mashing schedule from said performance model;
receive a measured final gravity measurement after said second mashing schedule has been executed;
determining an error being a difference between said expected final gravity measurement and said measured final gravity measurement; and update said performance model based on said error.

4. The system of claim 3, said control system further configured to:
collect a plurality of errors from a plurality of measured final gravity measurements, each of said plurality of measured final gravity measurements being taken for a different second mashing schedule; and
update said performance model based on said plurality of errors.

5. The system of claim 4, said plurality of measured final gravity measurements being collected from a plurality of computer controlled beer brewing systems.

6. The system of claim 5, said performance model comprising input parameters from a group comprising:
grain bill;
machine type;
ambient temperature; and
ambient atmospheric pressure.

* * * * *